United States Patent [19]

Shellhause

[11] Patent Number: 4,706,784
[45] Date of Patent: Nov. 17, 1987

[54] DRUM BRAKE ADJUSTERS

[75] Inventor: Ronald L. Shellhause, Vandalia, Ohio

[73] Assignee: General Motors Corporation, Detroit, Mich.

[21] Appl. No.: 771,770

[22] Filed: Sep. 3, 1985

[51] Int. Cl.$^4$ ............................................. F16D 65/40
[52] U.S. Cl. ........................ 188/79.5 B; 188/196 BA
[58] Field of Search ...................... 188/79.5 B, 79.5 P, 188/79.56 C, 196 B, 196 BA, 196 C

[56] References Cited

U.S. PATENT DOCUMENTS

| | | | |
|---|---|---|---|
| 2,034,922 | 3/1936 | Presnell | 188/79.5 B |
| 2,873,006 | 2/1959 | Phillips | 188/79.5 B |
| 4,148,380 | 4/1979 | Haraikawa | 188/79.5 B |
| 4,385,681 | 5/1983 | Conrad et al. | 188/79.5 B |
| 4,390,086 | 6/1983 | Conrad | 188/79.5 B |

FOREIGN PATENT DOCUMENTS 2088977  6/1982  United Kingdom ........... 188/79.5 B

Primary Examiner—George E. A. Halvosa
Assistant Examiner—Matthew C. Graham
Attorney, Agent, or Firm—D. D. McGraw

[57] ABSTRACT

A self-contained drum brake adjuster mechanism using an escapement drive arrangement to provide adjustment. A bi-metal spring, used in the normal adjustment operation, contracts at higher brake temperatures to prevent over-adjustment of the brake when the drum is overly expanded due to heat generated by heavy brake applications.

11 Claims, 12 Drawing Figures

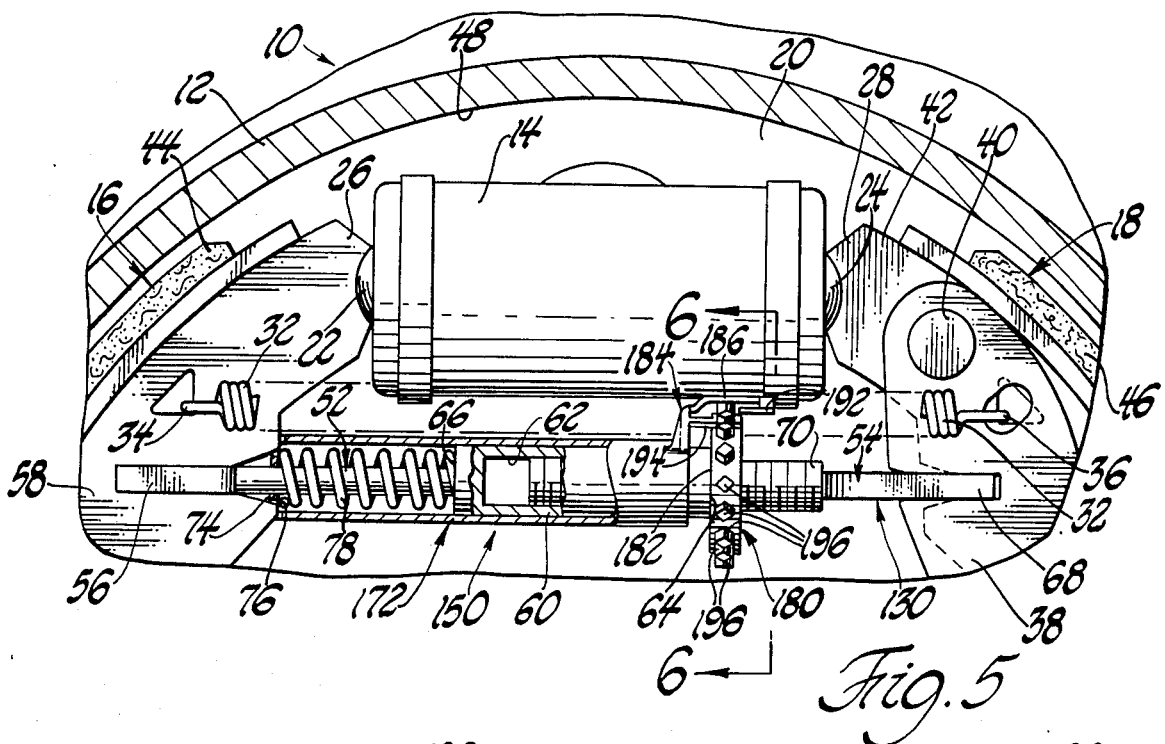
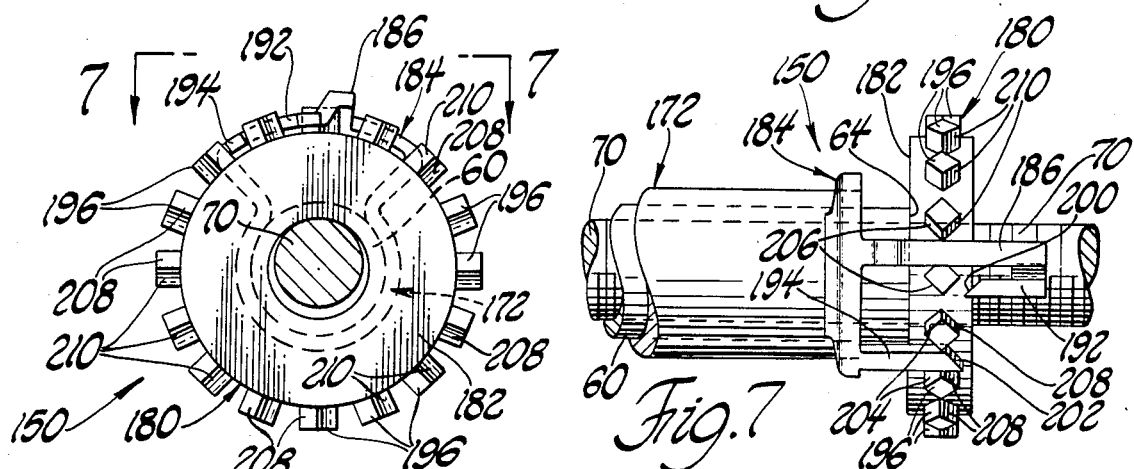
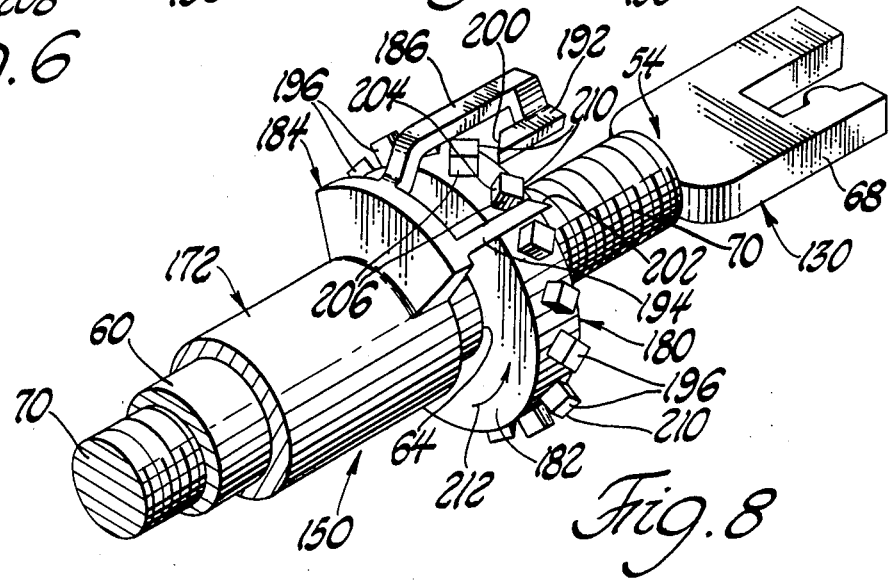

DRUM BRAKE ADJUSTERS

The invention relates to adjuster mechanisms for use in a drum brake, and more particularly to mechanisms of the expandable strut type using a screw-nut adjusting arrangement with all of the actuating mechanism being self-contained as a part of the expandable strut. While the adjuster mechanisms embodying the invention are particularly useful in leading-trailing drum brake arrangements, their use is not limited to such arrangements.

A typical drum brake adjuster in common use in production vehicles uses an expandable strut with an adjuster screw-nut or star wheel rotated thereon to move on threads to increase the effective strut length to adjust the brake shoes as needed. The screw-nut or star wheel is actuated by a pawl formed as a part of a pawl lever. The pawl lever is usually pivoted on the web of one of the brake shoes or some other brake member such as a wheel cylinder housing, a brake shoe anchor, or a backing plate. The pawl lever is commonly spring loaded for operation. One example of such an adjuster is shown in U.S. Pat. No. 3,963,100, issued June 15, 1976. This expandable strut adjuster has an operating arm for mechanical operation pivoted to one of the shoes. The strut extends between the shoes and includes a ratchet formed on the outer periphery of a nut threaded on a portion of the adjustable length strut. A pawl lever has one arm carrying a pawl which cooperates with a ratchet, a second arm engaging one end of the strut, and biasing means urging the second arm into permanent engagement with the end of the strut to urge it axially into engagement with the operating arm. The adjusting pawl advances with every brake apply, whether or not it moves sufficiently to rotate the ratchet. Under some circumstances it is capable of moving past more than one ratchet tooth on one advancement leading to overadjustment. The brake assembly in which the adjuster is installed has a parking brake lever or operating arm pivoted on the web of the other shoe, and therefore at the opposite end of the expandable strut from the pawl lever. This arrangement requires assembly of several parts on a brake shoe, as well as mirror image parts for left and right drum brakes.

Adjusters of the type shown in U.S. Pat. No. 3,963,100 have sometimes been provided with a thermal expansion spring element composed of two leaves joined at a hinge-like section, the two leaves having aligned openings through which the adjuster threaded part is received so that the leaves are positioned between the tubular part and the adjuster nut. When this element is exposed to high brake temperatures, the spring element normally expands so that the leaves move apart, increasing the space between the tubular part and the adjuster nut and overcoming the force of the pawl lever spring in so doing, thereby causing the strut to increase in effective length and act as if the brakes have not been expanded as much as is actually the case. This therefore prevents the adjuster mechanism from adjusting for hot brake drum expansion by thermally expanding the length of the adjustable strut under these conditions. The location of the thermo-sensitive element in the area of the strut is such that if the brake is applied heavily and rapidly so that heavy braking action is taking place, the brake heat may be built up so fast that the thermo-sensitive element may not have time to be responsive to the heat build-up and the brake may adjust anyway. As or immediately after the brake is released, the thermo-sensitive element will become responsive to the high temperature and will then expand so as to further expand the strut. This can cause the brake shoes to drag since the expansion of the strut is in effect a brake actuation type of movement. This can cause more brake lining wear than when otherwise be the case, and can also generate brake heat which may even be sufficient to maintain the thermo-sensitive element in the expanded position so that the brakes continue to drag. It therefore can defeat the very purpose for which it is intended.

In the structures embodying the invention, the thermo-sensitive element or elements are not thermally loaded in a direction which will force any additional drag on the brake shoes whenever they sense the high temperatures resulting from excessive brake heat. Even if they do not immediately sense the heat because of a fast rise in brake temperature due to fast and heavy brake actuations, they will not cause the shoes to be further expanded in addition to a brake adjustment. Therefore they will not permit the brake system to get into a condition which is degenerative because of the action of the thermo-sensitive element under the adverse conditions above described.

Expandable strut adjusting mechanisms of the type used in duo-servo brakes are typically shown in U.S. Pat. Nos. 3,050,156, issued Aug. 21, 1962 and 3,103,992, issued Sept. 17, 1963. These adjusters are also actuated by pawls which are pivoted on a brake shoe web. U.S. Pat. No. 2,570,398, issued Oct. 9, 1951, discloses a leading-trailing shoe adjusting mechanism using a star wheel to expand a strut. When adjustment is required, a pawl mounted on a brake shoe web is rotated against a pawl spring to advance the pawl to the next tooth on the star wheel. When the brake is released, the pawl spring moves the pawl in the other direction and rotates the wheel through an angle corresponding to the one tooth. In this patent, the pawl is part of an arm which is made of a bi-metal blade. If the brake becomes hot from prolonged application, the bi-metal blade will bend away from the wheel and the pawl will not contact a new tooth even if the brake clearance is greater than normal.

The adjusting mechanisms embodying the invention include a self-contained expansion strut in which the left hand and right hand parts are the same. This therefore permits adjusters to be manufactured for the left side and the right side brakes of a vehicle without any changes in construction, part numbers, etc. The mechanisms use an escapement drive which may readily provide fine or close adjustment. A mechanism may include a spring which is sensitive to the higher temperatures occurring in the drum brake with hard braking, and operates to disable the adjuster while such higher temperatures exist. This prevents the adjusting mechanism from over-adjusting because of heat expansion of the brake drum which increases the distance required for the shoes to move to engage the drum and therefore sends a signal to the adjusting mechanism that adjustment is required when in fact no adjustment may be needed after the brake has cooled off. If adjustment is accomplished while the brake is extremely hot, the amount of adjustment may be sufficient to leave the brakes locked up after the drum cools and contracts, because it then contracts to an extent that it engages the brake shoes in braking relation, even with the brakes in the released condition.

In one embodiment, the escapement mechanism used is of the anchor or crown-wheel type. In other embodiments, the escapement mechanism is of the sliding frame type. Either type of mechanism uses the escapement pallets as drive members which drive the escape-wheel. The escape-wheel is formed as part of the adjusting nut. Use of any of the embodiments permits the adjusting mechanism to be tailored to the particular brakes involved by replacing the escapement mechanism obtaining one adjustment level with an escapement mechanism obtaining a different adjustment level. By way of example, it is generally accepted that 0.030 inch is considered necessary for a normal effort stroke or apply stroke by the wheel cylinder. In the typical wheel cylinder with opposed pistons each driving a plunger connected to one of the brake shoes, this would be assumed to be 0.015 inch per piston. In any event, the strut embodying the invention will accommodate all of the travel of the pistons without having to consider different individual piston travels. Any additional distance over the base 0.030 inch apply stroke would be the added gap to provide the established desired clearance. Fine or close adjustment to a level of 0.015 inch center line clearance is easily accomplished with the double-acting escapement mechanisms disclosed and claimed.

IN THE DRAWINGS:

FIG. 5 is a view similar to FIG. 1 with parts broken away and in section and showing another embodiment of the brake adjuster mechanism of the invention. The brake assembly is shown in the brake released position.

FIG. 6 is a fragmentary cross-section view taken in the directions of arrows 6—6 of FIG. 5 and illustrating a part of the escapement mechanism embodying the invention.

FIG. 7 is an elevation view of the escapement mechanism, taken in the direction of arrows 7—7 of FIG. 6, and having parts broken away and in section.

FIG. 8 is a perspective view of a major portion of the brake adjuster mechanism of FIG. 5, with parts broken away and in section.

Figure 1:
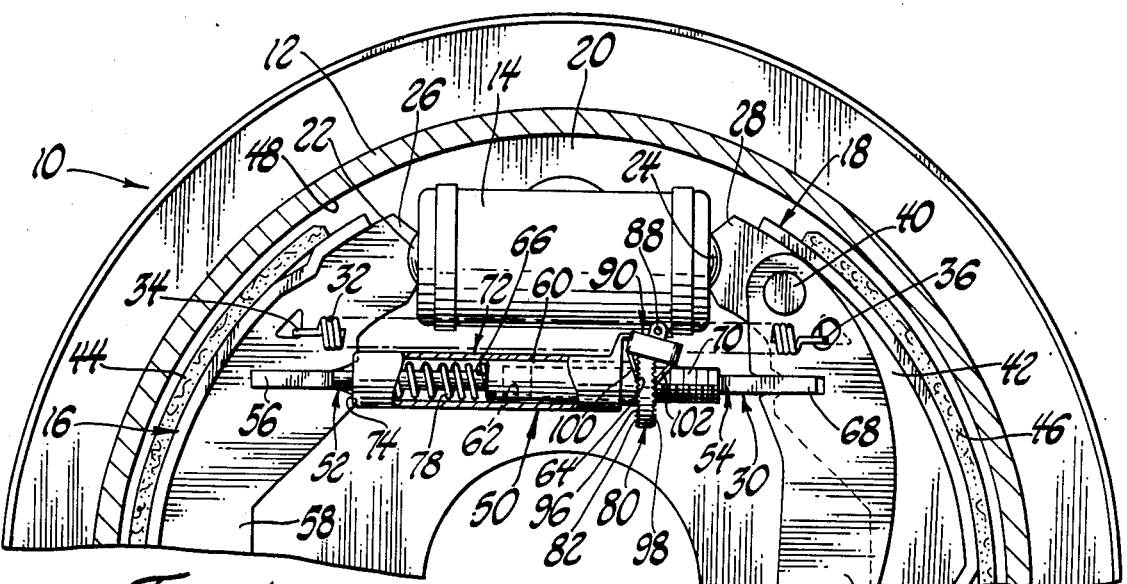
FIG. 1 is an elevation view of a drum brake assembly having parts broken away and in section and illustrating one embodiment of the brake adjuster mechanism of the invention. The brake assembly is illustrated in the brake released position.
Figure 2:
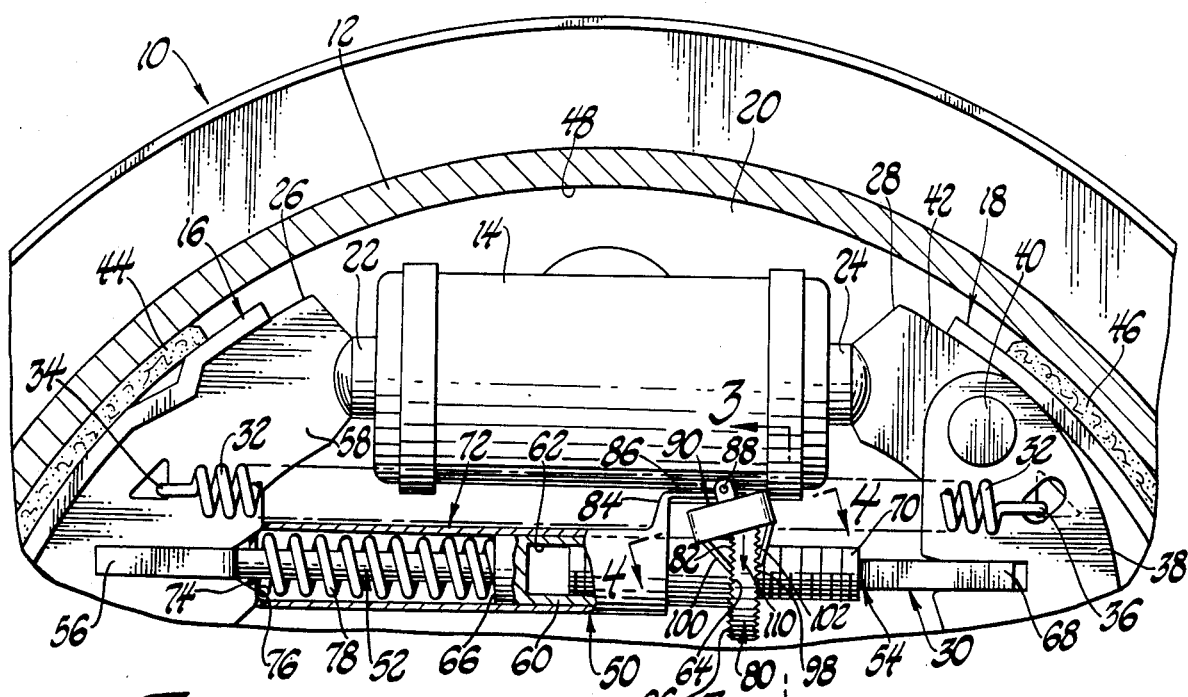
FIG. 2 is a view similar to FIG. 1, with parts broken away and in section and illustrating the brake assembly of FIG. 1 in the brake apply position.
Figure 3:
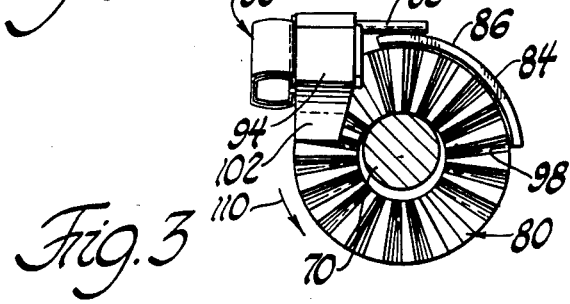
FIG. 3 is a fragmentary cross-section view of a part of the brake adjuster mechanism of FIG. 2, taken in the direction of arrows 3—3 of that Figure and having parts broken away.
Figure 4:
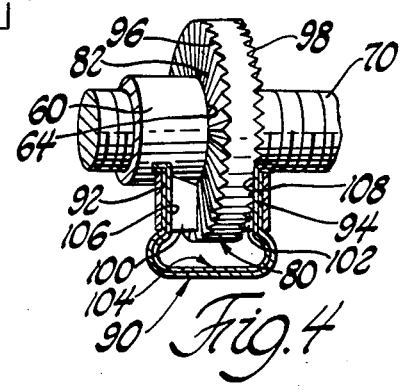
FIG. 4 is perspective view of the escapement mechanism used in the brake adjuster mechanism of FIGS. 1 and 2, with parts broken away and in section and taken in the direction of arrows 4—4 of FIG. 2.
Figure 9:
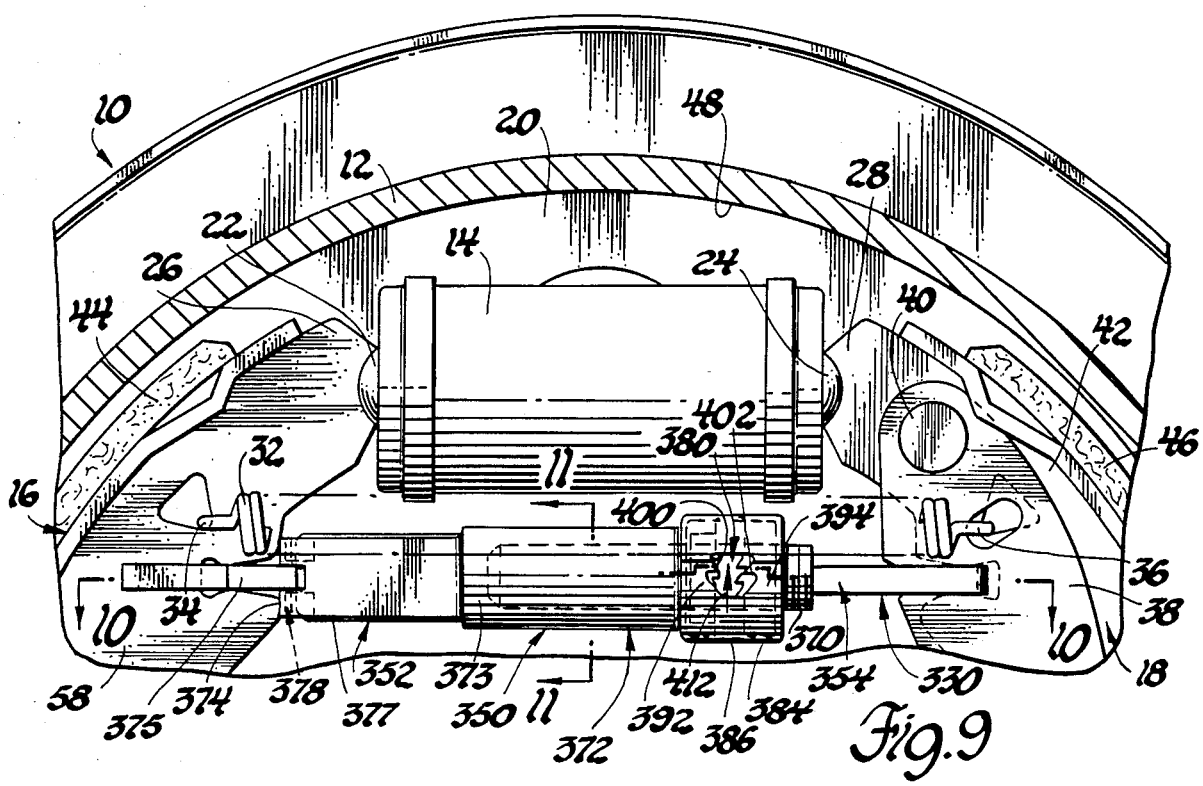
FIG. 9 is another view similar to FIG. 1 with parts broken away and showing another embodiment of the brake adjuster mechanism of the invention. The brake assembly is shown in the brake release position.
Figure 10:
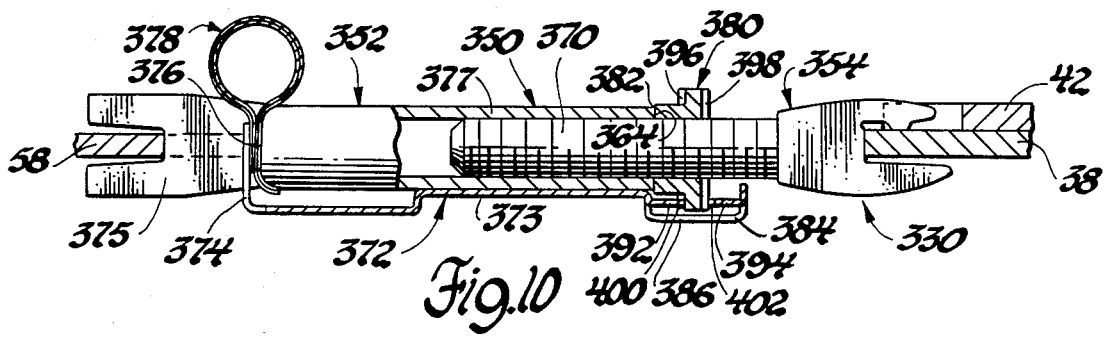
FIG. 10 is a fragmentary cross-section view taken in the direction of arrows 10—10 of FIG. 9 and illustrating the adjusting mechanism of that Figure.

The drum brake assembly 10 illustrated in FIGS. 1, 2, 5 and 9 includes a drum 12 to be braked, a wheel cylinder 14, and brake shoes 16 and 18 mounted on backing plate 20. The wheel cylinder 14 is of the typical opposed piston type, with the pistons therein driving opposed plungers 22 and 24. Plunger 22 engages the shoe end 26 of brake shoe 16, and plunger 24 engages the shoe end 28 of brake shoe 18. The drum brake assembly illustrated is preferably of the leading-trailing type in which shoe 16 is the leading shoe and shoe 18 is the trailing shoe. Therefore the ends of the shoes opposite shoe ends 26 and 28 are anchored to the backing plate in a manner well known in the art and not shown in the drawings. A strut 30, 130 or 330 engages and extends between the brake shoes 16 and 18. The strut is used to mechanically apply the brakes and is also an adjuster mechanism for adjusting the released position of the brake shoes, established by the mimimum effective length of the strut. A retraction spring 32 has one spring end 34 secured to shoe 16 and the other spring end 36 secured to shoe 18. A parking brake actuating lever 38 is pivotally secured at 40 to the shoe web 42 of shoe 18 and is also positioned in engageable relation with one end of the brake adjuster mechanism 30, 130 or 330. As is well known in the art, clockwise movement of lever 38 about its pivot 40, as seen in FIGS. 1 and 2, will result in mechanical force being exerted through the strut 30, 130 or 330 to expand shoes 16 and 18 until the shoe linings 44 and 46 engage the friction braking surface 48 provided on the interior of brake drum 12.

The strut 30 of FIGS. 1 and 2 has a brake adjuster mechanism 50 formed as a part thereof. The strut assembly includes axially aligned strut sections 52 and 54. Strut section 52 has one end 56 which is notched in the usual manner and fits within a notch in the shoe web 58 of brake shoe 16 as is well known in the art, so as to engage that shoe in force transmitting relation. The other end of strut section 52 is formed as a tube portion 60 provided with a recess 62 so that the tube open end 64 extends toward brake shoe 18. A shoulder 66 is formed on the tube portion 60 where the strut section end 56 joins the tube section. Strut section 54 has an end 68 formed similarly to end 56 of strut section 52, and also has an externally threaded portion 70 which extends toward brake shoe 16 and is received in the recess 62 of tube portion 60 for reciprocal movement. The strut section end 68 engages the brake shoe web 42 of shoe 18 and also engages the parking brake lever 38, as is well known in the art.

A sleeve 72 is coaxially received over strut portion 52. Sleeve 72 has one end 74 through which strut section 52 extends. Sleeve end 74 is normally in abutting relation with shoe web 58, and is slotted so that it is held against rotation by receipt of portion of shoe web 58 within the slot. The sleeve end 74 provides an annular spring seat 76 on the inner side thereof, the spring seat surrounding a portion of strut section 52. A compression spring 78 is received within sleeve 72 about strut section 52 and has one end abutting shoulder 66 and the other end abutting spring seat 76. Spring 78 urges strut section 54 toward shoe 18 and the sleeve 72 toward shoe 16. An adjuster nut 80 is threaded on the externally threaded portion 70 of strut section 54 so that one nut side 82 is axially engageable with the tube open end 64. It can be seen that the position of adjuster nut 80 on the externally threaded portion 70 of strut section 54, cooperating with the tube open end 64 of strut section 52, establishes the minimum effective length of the strut 30.

The portion of the escapement mechanism for rotating the adjuster nut 80 to obtain brake adjustment is supported on the sleeve 72 by a frame 84 which has an arm 86 extending over the outer periphery of the adjuster nut 80. The escapement verge or pivot pin 88 is secured to arm 86 so that its axis is in perpendicular skew relation to the common axis of the strut sections 52 and 54 and sleeve 72. The verge 88 pivotally supports a U-shaped member 90 which is the escapement drive means of the escapement mechanism. Member 90 has arms 92 and 94 which straddle the adjuster nut 80. The adjuster nut 80 has face teeth 96 formed on side 82 thereof and face teeth 98 formed on the other side thereof. The adjuster nut 80, with its face teeth 96 and 98, forms an escape-wheel which is the driven escapement member of the escapement mechanism.

Arms 92 and 94 straddle the adjuster nut or escape-wheel 80, and respectively have pallets 100 and 102 formed on the ends thereof. Pallets 100 and 102 are positioned in cooperation with teeth 96 and 98 to engage those teeth in alternate driving relation. A temperature sensitive bi-metal spring 104 may be mounted on the U-shaped member 90. Spring 104 may also be generally U-shaped so that its substantially parallel legs 106 and 108 are received within the U-shaped member 90 and engage the arms 92 and 94. Spring 104 does not normally exert a pressure on the arms 92 and 94 which will move them apart. However, with an increase in brake operating temperature when the brake has been applied heavily, so that the brake drum 12 has expanded to the extent that it is no longer desirable to adjust the brake shoes in accordance with the distance between the brake shoe linings and the drum friction surface 48, spring 104 will be caused by the heat within the brake to expand its legs 106 and 108 apart, moving the arms 92 and 94 outwardly and axially away from the adjuster nut 80 so that the pallets 100 and 102 cannot engage the teeth 96 and 98 in driving relation irrespective of the tendency of the adjusting mechanism to do so. This will render the adjuster escape mechanism ineffective to adjust the brake so long as the brake temperature is at or above the predetermined brake temperature beyond which it is not desired to make such adjustments. This will prevent over-adjustment of the brake under such high heat conditions.

Instead, or in addition to, the bi-metal spring 104, spring 78 may be a bi-metal spring also sensitive to such brake temperatures so that spring 78 will contract at the predetermined temperature beyond which it is not desired to provide brake adjustment. As will be described below in operation of the adjuster mechanism, this will likewise prevent over-adjustment of the brake under that condition.

In the brake released condition illustrated in FIG. 1, brake shoes 16 and 18 are retracted so that their respective brake linings 44 and 46 are spaced radially inward from the friction braking surface 48 of drum 12 to the desired extent. They are held in this position by the retracting spring 32. Brake shoe 16, in abutting engagement with sleeve 72 and also with the strut section 52, has moved sleeve 72 against the compressive force of spring 78 so that the verge 88 is near or beyond the plane of the side of the adjuster nut 80 on which teeth 98 are formed. In moving to this position, the U-shaped escapement drive member 90 is pivoted on verge 88 and about the point of engagement of pallet 102 with one of the teeth 98, raising pallet 100 over one of the teeth 96. The mechanism is therefore in the position shown in FIG. 1. The tube open end 64 of the strut section 52 is in abutting engagement with the side 82 of the adjuster nut 80 and the effective minimum length of strut 30 is therefore established. This effective minimum length establishes the spacing between brake shoes 16 and 18 and therefore the amount of clearance between the brake linings 44 and 46 in relation to the drum friction braking surface 48.

When the brake is actuated by brake pressure transmitted to the wheel cylinder 14, plungers 22 and 24 are moved outwardly of the wheel cylinder to move the brake shoes 16 and 18 into engagement with the friction braking surface 48 of drum 12. This occurs against the force of retraction spring 32. Spring 78 will continue to urge the strut section 52 rightwardly toward the shoe 18 and therefore the strut section end 56 will be maintained in position while shoe 16 moves leftwardly as seen in FIGS. 1 and 2. Since spring 78 also acts against sleeve 72, it will move that sleeve in following relation to shoe 16 so as to maintain the sleeve end 74 in abutting engagement with the shoe web 58. This axial movement of sleeve 72 will carry with it the support frame 84 and therefore the verge 88. Verge 88 will be moving toward the plane of the side 82 of the adjuster nut 80. This will cause a slight pivoting or rocking action of the U-shaped escapement drive member 90 about the verge 88. If the leftward movement of sleeve 72, as seen in FIGS. 1 and 2, is insufficient to require adjustment of the strut 30, the pallets 100 and 102 will not exert sufficient force on the teeth 96 and 98 of the adjuster nut so as to drive that nut rotationally. However, if the amount of shoe actuation required to expand the shoes into contact with the brake drum is sufficient to require adjustment, the escapement drive member 90 will be moved by support frame 84 and verge 88 in a direction away from brake shoe 18 to such an extent that the pallet 100, by escapement action, will cause the adjuster nut 80 to be driven rotationally in the direction indicated by arrow 110. This will cause the adjuster nut 80 to be moved axially by the threaded action of the nut on the threads of the strut externally threaded portion 70, such axial movement of the nut being leftwardly as seen in FIGS. 1 and 2. This will slightly increase the effective minimum length of the strut 30.

Upon brake release, the retracting spring 32 will pull the brake shoes 16 and 18 back toward the position shown in FIG. 1, moving sleeve 72 rightwardly relative to strut section 54 and adjuster nut 80 as seen in those figures and again compressing spring 78 in so doing. This rightward movement of sleeve 72 will also cause the frame 84 and verge 88 to move rightwardly back to the position shown in FIG. 1. This movement will cause pallet 102 to move the adjuster nut or escape-wheel 80 further in the direction of arrow 110, completing the double-acting adjustment of the strut 30 by means of the escapement mechanism.

It can be seen that if the heat generated by actuation of the brake assembly 10 is sufficient to raise the temperature in the area of spring 78 to the predetermined temperature above which it is not desired to provide an adjustment and, if spring 78 is a bi-metal spring which will contract at such higher temperatures, the contraction of spring 78 under such conditions will result in less or even no leftward movement of sleeve 72 during brake actuation since the amount of expansion of spring 78 would therefore be decreased or even reduced to zero. Therefore there would be no leftward movement of sleeve 72 and there would be no adjustment actuation of the escapement mechanism.

If the bi-metal spring 104 is used, either independently of the bi-metal construction of spring 78 or concurrently therewith, the expansion of spring 104 to remove pallets 100 and 102 from engagement with the teeth 96 and 98 of the adjuster wheel 80 will also render the adjustment mechanism inoperative to adjust the brake when the temperature is sufficient to cause the bi-metal spring 104 to so expand.

The embodiment shown in FIGS. 5–8 of the drawings is a modification of the embodiment shown in FIGS. 1–4. Since many of the brake elements are the same or similar, similar reference numerals have been used where appropriate. The strut and adjuster mechanism forming a part of the strut are somewhat different from that of the earlier described embodiment. Otherwise the brake construction is the same as that shown in FIGS. 1–4 and that description is not repeated. The strut assembly 130 of FIGS. 5–8 has a brake adjuster mechanism 150 formed as a part thereof. The strut assembly has the same or similar axially aligned strut sections 52 and 54 constructed and arranged as that shown and described with regard to FIGS. 1–4 above. A somewhat modified sleeve 172 is coaxially received over the strut portion 52. The sleeve modification is in the area of the support frame and the escapement drive means. The other portions of the sleeve are constructed in the same manner as is sleeve 72 of FIG. 1. Spring 78, acting on sleeve 172 and on the strut section 52 is the same spring as that shown in FIG. 1. As above described, spring 78 may be a bi-metal spring which contracts at elevated temperatures and prevents adjustment when the brake is overheated.

A modified adjuster nut 180 is threaded on the externally threaded portion 70 of strut section 54 so that the nut side 182 is axially engageable with the tube open end 64. Because the nut 180 is to be rotated in the opposite direction to the rotation of nut 80 to expand the strut assembly, the threads on the strut section 54 threaded portion 70 are to be of the opposite hand as compared to the similar threads in the arrangement of FIGS. 1–4.

The modified escapement mechanism for rotating the adjuster nut 180 to obtain brake adjustment is supported on the sleeve 172 by a support frame 184. This frame includes an arm 186 extending over the outer periphery of the adjuster nut 180. Arm 186 is somewhat J-shaped, with the first portion being radially beyond the periphery of the nut 180. The arm 186 terminates in another arm 192 which is positioned radially inward relative to the first portion of arm 186, and may also be slightly circumferentially spaced therefrom as illustrated. Frame 184 includes another arm 194 which extends across the adjuster nut 180. The adjuster nut is provided with teeth 196, illustated as being formed as small blocks extending radially outward from the main body of the adjuster nut 180. Teeth 196 are circumferentially spaced around the outer periphery of the main body of the adjuster nut 180 so that arm 194 may extend between the teeth as illustrated in the drawings and arm 192 may, upon sufficient axial movement in the leftward direction as seen in the drawings, also extend between two adjacent teeth 196. The free ends of arms 192 and 194 are beveled to respectively provide escapement pallets 200 and 202. Each tooth 196 is provided with four tooth faces which are in surface engageable and driving relation with either pallet 200 or 202 at various times. More particularly, referring to a single tooth 196, the tooth has faces 204 and 206 which generally face toward the side 182 of the adjuster nut but are in planes at an angle to the major plane of the adjuster nut 180. The tooth has faces 208 and 210 which generally face toward the other side of the adjuster nut and are similarly angularly positioned. Therefore as seen in the drawing, the teeth 196 appear somewhat like cubes with the four teeth faces being so arranged that face 206 is at times engageable by pallet 202 and face 210 is at times engageable by pallet 200. It is to be understood that the axial spacing of pallets 200 and 202 relative to each other is such that when arm 192 is moved leftwardly until pallet 200 engages a toothed face 210, arm 194 is moved sufficiently leftward so as to be clear of the rotating path of teeth 196. Therefore the escapement drive movement of the escape-wheel adjuster nut 180 by means of pallet 200 and one of the teeth will not be obstructed by the location of arm 194. Similarly, when the arms 192 and 194 are moved rightwardly as seen in the drawings such that pallet 202 acts on tooth face 206, arm 192 will be moved so as to be clear of the rotating path of the teeth 196 to accommodate movement of the adjuster nut 180 by the escapement drive mechanism.

When the brake is actuated, the operation is generally similar to that of the first embodiment described above. Sleeve 172 will move leftwardly relative to strut sections 52 and 54 under the force of spring 78, carrying the escapement drive mechanism formed by frame 184 with it. If the leftward axial movement is sufficient, pallet 200 will engage a tooth face 210 and, due to the beveled arrangement thereof, will then move the tooth and therefore the adjuster nut 180 rotationally in the direction of arrow 212. This will, by threaded action of the threaded portion 70, cause the adjuster nut 180 to be moved slightly leftward, providing some adjustment to the mechanism. As the brake is released, the sleeve 172 will move rightwardly to return to the position shown in FIG. 5, so that pallet 202 will engage a toothed face 206 and will move a tooth 196 and therefore the adjuster nut 180 slightly further in the direction of arrow 212, accommodating a slight additional adjustment of the mechanism. It can be seen that insufficient movement of the sleeve 172 in the leftward direction to cause pallet 200 to engage the tooth face 210 and then, by further leftward movement, to move the tooth, no adjustment of the mechanism will be required or accomplished. Upon brake release, the sleeve 172 and the escapement drive mechanism, including pallet 202, will merely return to the position shown without engaging a tooth in drive relation. Therefore the adjuster mechanism 150 will not make an adjustment which is not required.

As described above, when spring 78 is a bi-metal spring which contracts at elevated brake temperatures occurring when it is not desirable to adjust the mechansim, the sleeve 172 will not be moved leftwardly sufficiently to cause an adjustment.

The embodiment shown in FIGS. 9–12 of the drawings is a modification of the embodiment shown in FIGS. 5–8. Since many of the brake elements are the same or similar, similar reference numerals have been used where appropriate. The strut and adjuster mechanism forming a part of the strut are somewhat different from that of the earlier described embodiment of FIGS. 1–4. Otherwise, the brake construction is the same as that shown in FIGS. 1–4 and that description is not repeated. The strut assembly 330 of FIGS. 9–12 has a brake adjuster mechanism 350 formed as a part thereof. The strut assembly has axially aligned strut sections 352 and 354 constructed and arranged in a manner similar to those shown and described with regard to FIGS. 1-8 above. A modified sleeve 372 is coaxially received over the strut portion 352. The sleeve modification is in the area of the body, one end, and the escapement drive means at the other end. The body 373 of sleeve 372 is formed to be clipped over strut portion 352, as is better seen in FIG. 11. Sleeve end 374 is slotted to receive the flat end 375 of strut portion 352 and in parallel relation to the abutment 376 formed by the cylindrical part 377 of strut portion 352 about which sleeve body 373 is clipped. Spring 378, acting on sleeve 372 and on the end 376 of strut part 377 is a bi-metal spring which contracts at elevated temperatures so that it exerts no spring force between sleeve end 374 and strut abutment 376 and prevents adjustment when the brake is overheated.

A further modified adjuster nut 380, constructed much like nut 80 of FIGS. 1-4, is threaded on the externally threaded portion 370 of strut section 354 so that the nut side 382 is axially engageable with the tube open end 364. The nut 380 is to be rotated in the opposite direction of rotation as that of nut 80 to expand the strut assembly. Therefore the threads on the strut section threaded portion 370 are to be of the opposite hand as compared to the similar threads in the arrangement of FIGS. 1-4.

The modified escapement mechanism for rotating the adjuster nut 380 to obtain brake adjustment is formed as an integral stamped part of the sleeve 372 on sleeve end 384. This includes arm 386 extending over the outer periphery of the adjuster nut 380. The arm 386 has another arm 392 which is struck so as to be positioned radially inward relative to the body of arm 386. Arm 386 includes another arm 394 which is also struck so as to be positioned radially inward relative to the body of arm 386. Arms 392 and 394 are therefore on opposite sides of adjuster nut 380. The adjuster nut 380 is provided with side face teeth 396 and 398 respectively aligned for driving engagement with teeth 400 and 402 formed on arms 392 and 394. Teeth 400 and 402 respectively provide escapement pallets for escapement driving action. Use of one tooth 400, 402 on each arm 392, 394 will give adequately fine adjustment for most brakes. However, if finer adjustments are required, tooth 400 may be made as two or even three teeth, as may tooth 402.

When the brake is actuated, the operation is generally similar to that of the second embodiment described above. Sleeve 372 will move leftwardly relative to strut sections 352 and 354 under the force of spring 378, as indicated by arrow 404 of FIG. 12, carrying the escapement drive mechanism formed by sleeve end 384 with it. If the leftward axial movement is sufficient, pallet or tooth 402 will engage a tooth 398 and, due to the beveled arrangement thereof, will then move the tooth and therefore the adjuster nut 380 rotationally in the direction of arrow 412 of FIG. 9. This will, by threaded action of the threaded portion 370, cause the adjuster nut 380 to be moved slightly leftward, providing some adjustment to the mechanism. As the brake is released, the sleeve 372 will move rightwardly to return to the position shown in FIG. 9, so that tooth or pallet 400 will engage a tooth 396 and will move the adjuster nut 380 slightly further in the direction of arrow 412, accommodating a slight additional adjustment of the mechanism. It can be seen that insufficient movement of the sleeve 372 in the leftward direction to cause tooth or pallet 402 to engage a tooth 398 and then, by further leftward movement, to move the tooth, no adjustment of the mechanism will be required or accomplished. Upon brake release, the sleeve 372 and the escapement drive mechanism, including pallet or tooth 402, will merely return to the position shown in FIG. 9 without engaging a tooth in drive relation. Therefore the adjuster mechanism will not make an adjustment which is not required.

Figures 11, 12:
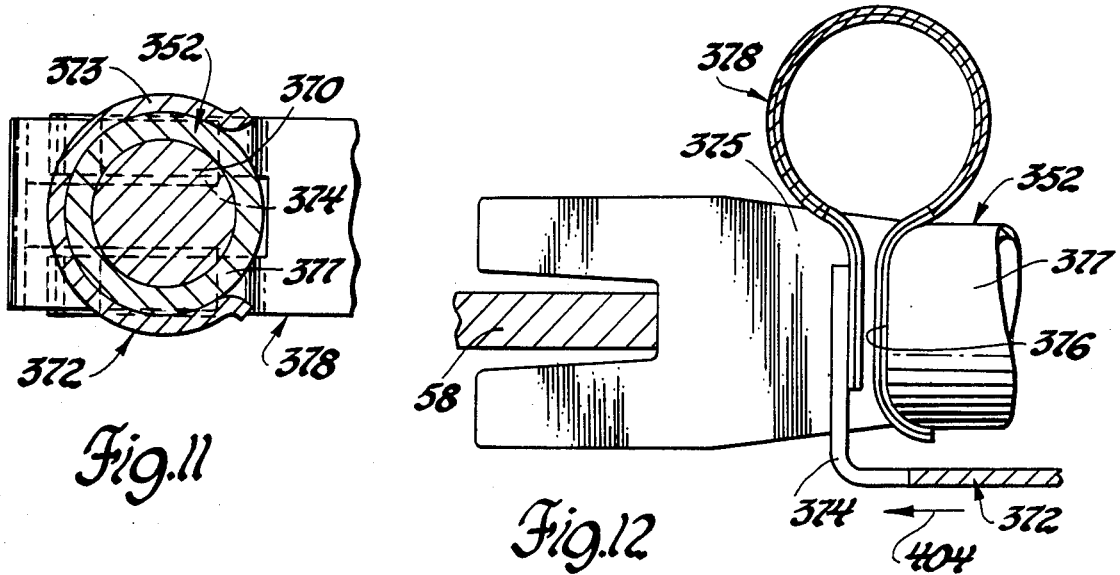
FIG. 11 is a fragmentary cross-section view taken in the direction of arrows 11—11 of FIG. 9 and illustrating a portion of the adjusting mechanism of that figure.
FIG. 12 is an enlarged view of a portion of the adjuster mechanism as seen in FIG. 10, showing the mechanism with the strut expanded to provide an adjustment action.

As described above, spring 378 is a bi-metal spring which contracts at elevated brake temperatures occurring when it is not desirable to adjust the mechansim. The sleeve 372 will then not be moved leftwardly, as illustrated in FIG. 12, sufficiently to cause an adjustment.

The invention is embodied in a compact escapement drive arrangement which may provide for brake adjustment in either left side or right side brake assemblies of a vehicle, and which may prevent adjustment when the brake becomes overheated. Any of several types of escapement mechansims may be used, so long as they are sensitive to axial movement of an element such as sleeve 72, 172 or 372.

The embodiments of the invention in which an exclusive property or priviledge is claimed are defined as follows:

1. A drum brake adjuster comprising an expandable strut adapted to extend between first and second brake shoes of a drum brake to be actuated and released and adjusted, said expandable strut having:

a first member, a second member telescopically received in said first member, and a third member telescopically receiving said first member and a portion of said second member, all in coaxial relation, said first and third members being adapted to operatively engage the first brake shoe in force-transmitting relation and said second member being adapted to operatively engage the second brake shoe in force-transmitting relation, and spring means acting on said first and third members continually urging said first member toward said second member and said third member away from said second member;

an adjusting element on said second member normally engaging said first member in abutting relation to limit the minimum length of said strut and movable on said second member toward said first member to increase the effective minimum length of said strut when sufficient brake shoe wear and actuation requires brake adjustment, said adjusting element including a driven escapement means incrementally actuatable to provide such adjustment;

and escapement drive means on said third member engageable, in a brake actuation and release cycle in which brake adjustment is required, with said driven escapement means in driving relation at least once during such a brake actuation and release cycle, said escapement drive means when so engaging said driven escapement means driving said adjusting element to move same on said second member axially toward said first member so that when the brake is fully released said first member abuttingly engages said adjusting element at an increased strut minimum length position to establish an adjusted position of the brake shoes.

2. The drum brake adjuster of claim 1, said spring means including a temperature sensitive spring which at a predetermined brake temperature contracts sufficiently to render said spring means unable to move said third member axially relative to said adjusting element and said second member through a sufficient distance to cause said escapement drive means to drive said escapement driven member, rendering said adjuster ineffective to change the brake adjustment so long as the brake temperature is at or above the predetermined brake temperature and preventing over-adjustment of the brake under that condition.

3. A drum brake adjuster comprising an expandable strut adapted to extend between first and second brake shoes of a drum brake to be actuated and released and adjusted, said expandable strut having:

a first member, a second member telescopically received in said first member, and a third member telescopically receiving said first member and a portion of said second member, all in coaxial relation, said first and third members being adapted to operatively engage the first brake shoe in force-transmitting relation, said second member being adapted to operatively engage the second brake shoe in force-transmitting relation, and spring means acting on said first and third members continually urging said first member toward said second member and said third member away from said second member;

an adjusting element threaded on said second member and normally engaging said first member in abutting relation to limit the minimum length of said strut, said adjusting element being rotatably movable on said second member and by threaded action therefore being movable axially toward said first member to increase the effective minimum length of said strut when sufficient brake shoe wear and actuation requires brake adjustment, said adjusting element including driven escapement means incrementally actuatable to provide such adjustment;

and escapement drive means on said third member engageable, in a brake actuation and release cycle in which brake adjustment is required, with said driven escapement means in driving relation during the brake actuation portion of such cycle, said escapement drive means when so engaging said driven escapement means driving said adjusting element rotationally to move same by threaded action of said second member axially toward said first member, said escapement drive means being further engageable with said driven escapement means in driving relation during the brake release portion of such cycle, said escapement drive means when so engaging said driven escapement means driving said adjusting element rotationally to move same be threaded action further on said second member axially toward said first member, so that when the brake is fully released said first member abuttingly engages said adjusting element at an increased strut minimum length position to establish an adjusted position of the brake shoes.

4. The drum brake adjuster of claim 3, said driven escapement means being a wheel-like nut having face teeth on each side thereof and defining an escape-wheel, said escapement drive means being a generally U-shaped member having arms straddling said escape-wheel and having a pallet on each of said arms, said U-shaped member having a verge secured to said third member with the axis thereof being perpendicularly skew to the common axis of said first and second and third members, said U-shaped member being arcuately movable about said verge with said pallets engaging said teeth in alternate driving relation as said third member is moved relative to said second member and said driven escapement member in one axial direction upon brake application and in the opposite axial direction upon brake release, said pallets acting on said teeth to move said driven escapement member arcuately on said second member when the movements of said third member are sufficient to cause first one and then the other of said pallets to advance to an adjacent tooth from the one with which it is aligned for driving engagement while in the brake released condition.

5. The drum brake adjuster of claim 4, said U-shaped member having a temperature sensitive spring mounted thereon and engaging said arms so as to be able to exert spring force tending to spread said arms apart, said temperature sensitive spring expanding with an increase in brake temperature and at a predetermined brake temperature expanding sufficiently to move said arms outwardly axially away from said escape-wheel so that said pallets cannot engage said teeth in driving relation irrespective of the amount of axial movement of said third member, rendering said adjuster ineffective to adjust the brake so long as the brake temperature is at or above the predetermined brake temperature and thus preventing over-adjustment of the brake under that condition.

6. A brake adjuster for use in a drum brake assembly having a first shoe and a second shoe and means for expanding the shoes to engage a brake drum in braking relation and means for retracting the shoes for disengagement from the brake drum upon release and returning the shoes to an adjusted position determined by the brake adjuster, said brake adjuster comprising:

a strut comprising a first strut section formed at one end with a tube portion having an open end and having the first strut section other end adapted to engage the first shoe in force-transmitting relation, and a second strut section formed at one end with an externally threaded portion extending into said tube portion and having the second strut section other end adapted to engage the second shoe in force-transmitting relation;

an adjusting nut threaded on said second strut section threaded portion and having one side engageable with the open end of said first strut section tube portion and cooperating with said strut sections to define the effective length of said strut and therefore the position of the shoes relative to the brake drum when in the brake released condition, said adjusting nut having escapement driven means formed thereon;

a sleeve having a spring seat formed on one end with said first strut section other end received through said spring seat so that said first strut section tube portion is slidably received within said sleeve and extends outwardly therefrom toward said adjusting nut, said sleeve further having its other end extending over said adjusting nut, and escapement drive means on said sleeve other end positioned to engage said adjusting nut escapement driven means in escapement driving relation;

a spring received at least partially in said sleeve and acting on said spring seat and said first strut section to urge said first strut section tube portion outwardly of said sleeve and against said adjusting nut and to urge said sleeve axially away from said adjusting nut;

said spring upon brake actuation slidably moving said sleeve and said escapement drive means axially relative to said adjusting nut and upon sufficient of such axial movement causing said escapement drive means to act on said escapement driven means to cause said adjusting nut to rotate arcuately on said second strut section threaded portion to cause axial movement of said adjusting nut on said second strut section threaded portion to increase the effective length of said strut and adjust the brake.

7. A brake adjuster for use in a drum brake assembly having a first shoe and a second shoe and means for expanding the shoes to engage a brake drum in braking relation and means for retracting the shoes for disengagement from the brake drum upon release and returning the shoes to an adjusted position determined by the brake adjuster, said brake adjuster comprising:

a strut comprising a first strut section formed at one end with a tube portion having an open end and having the first strut section other end adapted to operatively engage the first shoe in force-transmitting relation, and a second strut section formed at one end with an externally threaded portion extending into said tube portion and having the second strut section other end adapted to operatively engage the second shoe in force-transmitting relation;

an adjusting nut threaded on said second strut section threaded portion and having one side engageable with the open end of said first strut section tube portion and cooperating with said strut sections to define the effective length of said strut and therefore the position of the shoes relative to the drum when in the brake released condition, said adjusting nut having double acting escapement driven means formed thereon;

a sleeve having a spring seat formed on one end with said first strut section other end received through said spring seat so that said first strut section tube portion is received within said sleeve and extends outwardly therefrom toward said adjusting nut, said sleeve further having its other end extending over said adjusting nut, and double acting escapement drive means on said sleeve other end positioned to engage said adjusting nut escapement driven means in double acting escapement driving relation;

a spring received at least in part in said sleeve and acting on said spring seat and said first strut section to urge said first strut section tube portion outwardly of said sleeve against said adjusting nut and to urge said sleeve axially away from said adjusting nut;

said spring upon brake actuation moving said sleeve and said escapement drive means axially relative to said adjusting nut and upon sufficient of such axial movement causing said escapement drive means to act on said escapement driven means to cause said adjusting nut to rotate arcuately on said second strut section threaded portion to cause axial movement of said adjusting nut on said second strut section threaded portion to increase the effective length of said strut and adjust the brake, said sleeve and said escapement drive means being moved axially against the force of said spring upon brake release by brake retracting movements of the brake shoes and by such movement causing said escapement drive means to again act on said escapement driven means to cause said adjusting nut to further rotate arcuately on said second strut section threaded portion to cause axial movement of said adjusting nut on said second strut section threaded portion to increase the effective length of said strut and further adjust the brake.

8. A drum brake adjuster comprising an expandable strut adapted to extend between first and second brake shoes of a drum brake to be actuated and released and adjusted, said expandable strut having:

a first member, a second member telescopically received in said first member, and a third member telescopically receiving said first member and a portion of said second member, all in coaxial relation, said first and third members being adapted to operatively engage in first brake shoe in force-transmitting relation and said second member being adapted to operatively engage the second brake shoe in force-transmitting relation, and spring means acting on said first and third members urging said first member toward said second member and said third member away from said second member;

an adjusting element on said second member normally engaging said first member in abutting relation to limit the minimum length of said strut and movable on said second member toward said first member to increase the effective minimum length of said strut when sufficient brake shoe wear and actuation requires brake adjustment, said adjusting element including driven escapement means incrementally actuatable to provide such adjustment;

escapement drive means on said third member engageable, in a brake actuation and release cycle in which brake adjustment is required, with said driven escapement means in driving force transfer relation at least once during such a brake actuation and release cycle, said escapement drive means when so engaging said driven escapement means driving said adjusting element to move same on said second member axially toward said first member so that when the brake is fully released said first member is moved to axially engage said adjusting element at an increased strut minimum length position to establish an adjusted position of the brake shoe;

and temperature responsive means responsive, at and above a predetermined brake temperature above which it is not desirable to adjust the brake because of possible over-adjustment under such temperature conditions in the brake, to interrupt the driving force transfer relationship between said escapement drive means and said escapement driven member and prevent said escapement drive means from driving said escapement driven member during a brake actuation and release cycle, rendering said adjuster ineffective to change the brake adjustment so long as the brake temperature is at or above the predetermined brake temperature.

9. The drum brake adjuster of claim 8, said temperature responsive means being a bi-metal spring defining said spring means.

10. The brake adjuster of claim 6 wherein said sleeve has a body portion between the sleeve one end and the sleeve other end, said body portion being formed in cross-section as a clip extending circumferentially more than 180° and less than 360° about said first strut section tube portion and being made of a spring material so as to be clipped over said tube portion by lateral movement of said sleeve relative to said tube portion and to be removed therefrom in a similar manner.

11. In a drum brake strut and brake adjuster mechanism in which the strut limits the retraction of the brake shoes of the drum brake and is linearly extendible by action of the adjusting mechanism to adjust for brake wear, the strut including a member moveable on one portion thereof in relation to another portion thereof to expand the effective length of the strut to obtain brake adjustment for wear, and means for so moving the adjusting member, the improvement comprising:

said last named means being a sleeve positioned axially about one portion of said strut and slidably moveable axially thereon during brake actuation and release to actuate said adjusting member when sufficient brake wear has been sensed by said adjusting mechanism, said sleeve being arcuate in cross-section throughout more than 180° and less than 360° so as to be clipped over said strut one section by lateral movement relative thereto and to be similarly removable therefrom so as to be removable and replaceable on said strut section without requiring removal of said strut from the drum brake in which it is installed.

* * * * *